(12) United States Patent
Bender et al.

(10) Patent No.: US 11,024,289 B2
(45) Date of Patent: Jun. 1, 2021

(54) COGNITIVE RECOMMENDATION ENGINE FACILITATING INTERACTION BETWEEN ENTITIES

(71) Applicant: INTERNATIONAL BUSINESS MACHINES CORPORATION, Armonk, NY (US)

(72) Inventors: Michael Bender, Rye Brook, NY (US); Edward T. Childress, Austin, TX (US); Rhonda L. Childress, Austin, TX (US); Charles D. Wriska, Lansing, MI (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1100 days.

(21) Appl. No.: 15/472,501

(22) Filed: Mar. 29, 2017

(65) Prior Publication Data
US 2018/0286387 A1  Oct. 4, 2018

(51) Int. Cl.
*G06N 5/04* (2006.01)
*G10L 15/07* (2013.01)
(Continued)

(52) U.S. Cl.
CPC .......... *G10L 15/075* (2013.01); *G06F 16/335* (2019.01); *G06F 16/3329* (2019.01);
(Continued)

(58) Field of Classification Search
CPC ............. G06N 5/00; G06N 5/04; G06N 5/022
(Continued)

(56) References Cited

U.S. PATENT DOCUMENTS 4,354,844 A   10/1982  Ickinger
5,819,008 A   10/1998  Asama et al.
(Continued)

OTHER PUBLICATIONS

Ross Mead ("Semio: Developing a Cloud-based Platform for Multimodal Conversational AI in Social Robotics." Jan. 8-11, 2017) (Year: 2017).*

(Continued)

*Primary Examiner* — Lut Wong
(74) *Attorney, Agent, or Firm* — Michael A. Petrocelli, Esq.; Kevin P. Radigan, Esq.; Heslin Rothenberg Farley & Mesiti P.C.

(57) ABSTRACT

A computer-implemented method is provided for facilitating an interaction between a first and second entity. The method includes instructing, by a cognitive recommendation engine, a communication aspect of the interaction between the first entity and the second entity. The instructing includes obtaining, by the cognitive recommendation engine, interaction preference data of the first entity related to the communication aspect of the interaction, and based on the interaction preference data, determining by the cognitive recommendation engine, an instruction recommendation. The instruction recommendation facilitates, from the first entity's view, the interaction between the first and second entities. Further, the instructing includes providing by the cognitive recommendation engine the instruction recommendation to the second entity for use by the second entity during the interaction with the first entity.

18 Claims, 8 Drawing Sheets

(51) Int. Cl.
- *G06N 5/02* (2006.01)
- *G10L 15/22* (2006.01)
- *G06Q 30/00* (2012.01)
- *G06F 16/335* (2019.01)
- *G06F 16/332* (2019.01)
- *G06N 5/00* (2006.01)
- *G06N 3/00* (2006.01)

(52) U.S. Cl.
CPC .............. *G06N 5/00* (2013.01); *G06N 5/022* (2013.01); *G06N 5/04* (2013.01); *G06Q 30/00* (2013.01); *G10L 15/22* (2013.01); *G06N 3/008* (2013.01); *G10L 2015/223* (2013.01); *G10L 2015/227* (2013.01)

(58) Field of Classification Search
USPC .......................................................... 706/45
See application file for complete search history.

(56) References Cited

U.S. PATENT DOCUMENTS

| | | |
|---|---|---|
| 6,594,844 B2 | 7/2003 | Jones |
| 7,818,090 B2 | 10/2010 | Okamoto |
| 8,935,006 B2 | 1/2015 | Vu et al. |
| 9,469,028 B2 | 10/2016 | Sisbot et al. |
| 2014/0249676 A1 | 9/2014 | Florencio et al. |
| 2016/0229058 A1 | 8/2016 | Pinter et al. |

OTHER PUBLICATIONS

Mead etal ("Automated Proxemic Feature Extraction and Behavior Recognition: Applications in Human-Robot Interaction" May 2013) (Year: 2013).*

Mumm, et al., "Human-Robot Proxemics: Physical and Psychological Distancing in Human-Robot Interaction", Proceedings of the 6th International Conference on Human-Robot Interaction, Lausanne, Switzerland, Mar. 6-9, 2011, (pp. 311-338).

Mel et al., "The NIST Definition of Cloud Computing," National Institute of Standards and Technology, Information Technology Laboratory, Special Publication 800-145, Sep. 2011, (pp. 1-7).

Wolchover, Natalie, "Why Do We Have Personal Space?", http://www.livescience.com/20801-personal-space.html, Jun. 6, 2012, (4 pages).

International Business Machines Corporation (IBM), "z/Architecture Principles of Operation," IBM® Publication No. SA22-7832-10, Eleventh Edition, Mar. 2015, pp. 1-1732.

International Business Machines Corporation (IBM), "Power ISA™ Version 2.07B," International Business Machines Corporation, Apr. 9, 2015, pp. 1-1527.

\* cited by examiner

400 — FACILITATING AN INTERACTION OF A FIRST ENTITY AND A SECOND ENTITY BY:

INSTRUCTING, BY A COGNITIVE RECOMMENDATION ENGINE, A COMMUNICATION ASPECT OF THE INTERACTION OF THE FIRST ENTITY AND THE SECOND ENTITY, THE INSTRUCTING INCLUDING:

- OBTAINING, BY THE COGNITIVE RECOMMENDATION ENGINE, INTERACTION PREFERENCE DATA OF THE FIRST ENTITY RELATED TO THE COMMUNICATION ASPECT OF THE INTERACTION;

- BASED ON THE INTERACTION PREFERENCE DATA, DETERMINING BY THE COGNITIVE RECOMMENDATION ENGINE AN INSTRUCTION RECOMMENDATION, THE INSTRUCTION RECOMMENDATION FACILITATING FROM THE FIRST ENTITY'S VIEW THE INTERACTION BETWEEN THE FIRST AND SECOND ENTITIES; AND

- PROVIDING BY THE COGNITIVE RECOMMENDATION ENGINE THE INSTRUCTION RECOMMENDATION TO THE SECOND ENTITY FOR USE BY THE SECOND ENTITY DURING THE INTERACTION WITH THE FIRST ENTITY

405 — IN WHICH THE COMMUNICATION ASPECT INCLUDES A NONVERBAL COMMUNICATION ASPECT OF THE INTERACTION BETWEEN THE FIRST AND SECOND ENTITIES

410 — IN WHICH THE NONVERBAL COMMUNICATION ASPECT INCLUDES A DISTANCE BETWEEN THE FIRST AND SECOND ENTITIES DURING THE INTERACTION

415 — WHERE THE FIRST ENTITY IS AN INDIVIDUAL, AND THE SECOND ENTITY IS A MOBILE ROBOTIC DEVICE, AND THE METHOD FURTHER INCLUDES ADJUSTING BY THE MOBILE ROBOTIC DEVICE THE DISTANCE BETWEEN THE FIRST AND SECOND ENTITIES DURING THE INTERACTION BASED ON THE INSTRUCTION RECOMMENDATION

FIG. 4A

420 — IN WHICH THE COGNITIVE RECOMMENDATION ENGINE DYNAMICALLY DETERMINES THE INSTRUCTION RECOMMENDATION BY, AT LEAST IN PART, MONITORING THE FIRST ENTITY DURING THE INTERACTION

425 — IN WHICH OBTAINING THE INTERACTION PREFERENCE DATA OF THE FIRST ENTITY INCLUDES MONITORING THE FIRST ENTITY DURING ONE OR MORE INTERACTIONS WITH ONE OR MORE OTHER ENTITIES

430 — IN WHICH THE ONE OR MORE INTERACTIONS INCLUDE THE INTERACTION BETWEEN THE FIRST AND SECOND ENTITIES, AND THE ONE OR MORE OTHER ENTITIES INCLUDE THE SECOND ENTITY

435 — IN WHICH THE OBTAINING THE INTERACTION PREFERENCE DATA INCLUDES MONITORING THE FIRST ENTITY VIA ONE OR MORE MONITORS TO CAPTURE FEEDBACK DATA ON THE FIRST ENTITY DURING THE ONE OR MORE INTERACTIONS INDICATIVE OF AN INTERACTION PREFERENCE OF THE FIRST ENTITY DURING THE ONE OR MORE INTERACTIONS, THE INTERACTION PREFERENCE DATA INCLUDING THE FEEDBACK DATA

440 — IN WHICH THE COGNITIVE RECOMMENDATION ENGINE DERIVES THE INTERACTION PREFERENCE OF THE FIRST ENTITY FROM THE INTERACTION PREFERENCE DATA AND DETERMINES THE INSTRUCTION RECOMMENDATION BASED ON THE DERIVED INTERACTION PREFERENCE OF THE FIRST ENTITY

445 — WHERE THE FIRST ENTITY IS A FIRST INDIVIDUAL AND THE SECOND ENTITY IS A SECOND INDIVIDUAL, AND PROVIDING BY THE COGNITIVE RECOMMENDATION ENGINE THE INSTRUCTION RECOMMENDATION INCLUDES PROVIDING THE INSTRUCTION RECOMMENDATION TO AN ELECTRONIC DEVICE ASSOCIATED WITH THE SECOND ENTITY FOR USE BY THE SECOND ENTITY DURING THE INTERACTION WITH THE FIRST ENTITY

450 — IN WHICH THE COMMUNICATION ASPECT INCLUDES A VERBAL COMMUNICATION ASPECT USED BY THE SECOND ENTITY DURING THE INTERACTION WITH THE FIRST ENTITY, THE FIRST ENTITY BEING A FIRST INDIVIDUAL AND THE SECOND ENTITY BEING A SECOND INDIVIDUAL OR A ROBOTIC DEVICE

FIG. 4B

COGNITIVE RECOMMENDATION ENGINE FACILITATING INTERACTION BETWEEN ENTITIES

BACKGROUND

Interaction between entities can involve a variety of interaction aspects, including verbal and non-verbal communication aspects. For instance, proxemics is one of several subcategories in the study of non-verbal communication between individuals. Proxemics is a study of human use of space and is a hidden component of interpersonal communication that can be uncovered through observation, and may be influenced by individual personalities and culture. The size of a space within which an interaction occurs, as well as the number of individuals and/or objects within the space, may further impact what is an appropriate interpersonal distance when two individuals are interacting.

SUMMARY

Certain shortcomings of the prior art are overcome and additional advantages are provided through the provision of a computer-implemented method of facilitating an interaction of a first entity and a second entity. The method includes instructing, by a cognitive recommendation engine, a communication aspect of the interaction of the first entity and the second entity. The instructing includes obtaining by the cognitive recommendation engine, interaction preference data of the first entity related to the communication aspect of the interaction, and based on the interaction preference data, determining by the cognitive recommendation engine an instruction recommendation. The instruction recommendation facilitates, from the first entity's view, the interaction between the first and second entities. Further, the method includes providing by the cognitive recommendation engine the instruction recommendation to the second entity for use by the second entity during the interaction with the first entity.

Advantageously, disclosed herein are a method, system, and computer program product for facilitating one or more communication aspects of an interaction between first and second entities. The communication aspect may be a non-verbal communication aspect or a verbal communication aspect of the interaction. In one or more embodiments, the first entity is an individual, and the second entity is either another individual, or a robotic device. Advantageously, the method, system, and computer program product disclosed herein utilize a cognitive recommendation engine to learn an individual's (e.g., first entity's) preference for one or more communication aspects of interaction. The cognitive recommendation engine may be a cognitive system, such as a cognitive cloud-based system, or other electronic device-based system associated with the first entity or the second entity. The cognitive recommendation engine collects and analyzes information about the first entity's preference for one or more communication aspects of the interaction. For instance, the cognitive recommendation engine may analyze obtained data for signs of stress, discomfort, or other difficulty by the first entity during the interaction with the second entity, and thereby facilitate providing one or more instruction recommendations to the second entity to adjust one or more communication aspects of the interaction, for instance, to facilitate from the first entity's view the interaction between the first and second entities. Further, the cognitive recommendation engine may learn or adjust the recommended instructions over time, for instance, as an individual becomes more comfortable in interacting with, for instance, a robotic device.

As noted, in one or more embodiments, the communication aspect may include a non-verbal communication aspect of the interaction between the first and second entities. For instance, the non-verbal communication aspect may include a distance between the first and second entities during the interaction. In one or more implementations, the first entity may be an individual, and the second entity a mobile robotic device. The method may further include adjusting by the mobile robotic device a distance from the first entity during the interaction based on the instruction recommendation(s).

In one or more implementations, the cognitive recommendation engine dynamically determines the instruction recommendation by, at least in part, monitoring the first entity during the interaction. More generally, obtaining the interaction preference data of the first entity may include monitoring the first entity during one or more interactions with one or more other entities. By way of example, the one or more interactions may include the interaction between the first and second entities, and the one or more other entities may include the second entity.

In one or more embodiments, obtaining the interaction preference data may include monitoring the first entity via one or more monitors to capture feedback data on the first entity during the one or more interactions indicative of an interaction preference of the first entity during the one or more interactions. The interaction preference data may include the feedback data. In one or more implementations, the cognitive recommendation engine derives the interaction preference of the first entity from the interaction preference data, and determines the instruction recommendation(s) based on the derived interaction preference of the first entity.

In one or more embodiments, the first entity may be a first individual, and the second entity a second individual, and providing by the cognitive recommendation engine the instruction recommendation(s) may include providing the instruction recommendation(s) to an electronic device associated with the second entity for use by the second entity during the interaction with the first entity.

In one or more embodiments, the communication aspect may be a verbal communication aspect used by the second entity during the interaction with the first entity, in which case the first entity may be a first individual and the second entity a second individual, or a robotic device.

In one or more other aspects, a system for facilitating an interaction between a first entity and a second entity is provided herein. The system includes a memory, and a processor communicatively coupled to the memory, wherein the system performs a method which includes obtaining, by a cognitive recommendation engine, interaction preference data of the first entity related to a communication aspect of the interaction, and based on the interaction preference data, determining by the cognitive recommendation engine an instruction recommendation. The instruction recommendation facilitates, from the first entity's view, the interaction between the first and second entities. Further, the method includes providing by the cognitive recommendation engine the instruction recommendation to the second entity for use by the second entity during the interaction with the first entity.

In one or more further aspects, a computer program product is provided for facilitating an interaction of a first entity and a second entity. The computer program product includes a computer-readable storage medium having computer-readable code embodied therewith. The computer-readable program code is executable by a processor to perform a method which includes instructing, by a cognitive recommendation engine, a communication aspect of the interaction of the first entity and the second entity. The instructing includes obtaining by the cognitive recommendation engine, interaction preference data of the first entity related to the communication aspect of the interaction, and based on the interaction preference data, determining by the cognitive recommendation engine an instruction recommendation. The instruction recommendation facilitates, from the first entity's view, the interaction between the first and second entities. Further, the method includes providing by the cognitive recommendation engine the instruction recommendation to the second entity for use by the second entity during the interaction with the first entity.

Further, services relating to one or more aspects are also described and may be claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIGS. 4A-4B depict a further embodiment of processing, in accordance with one or more aspects of the present invention;

DETAILED DESCRIPTION

Figure 1:
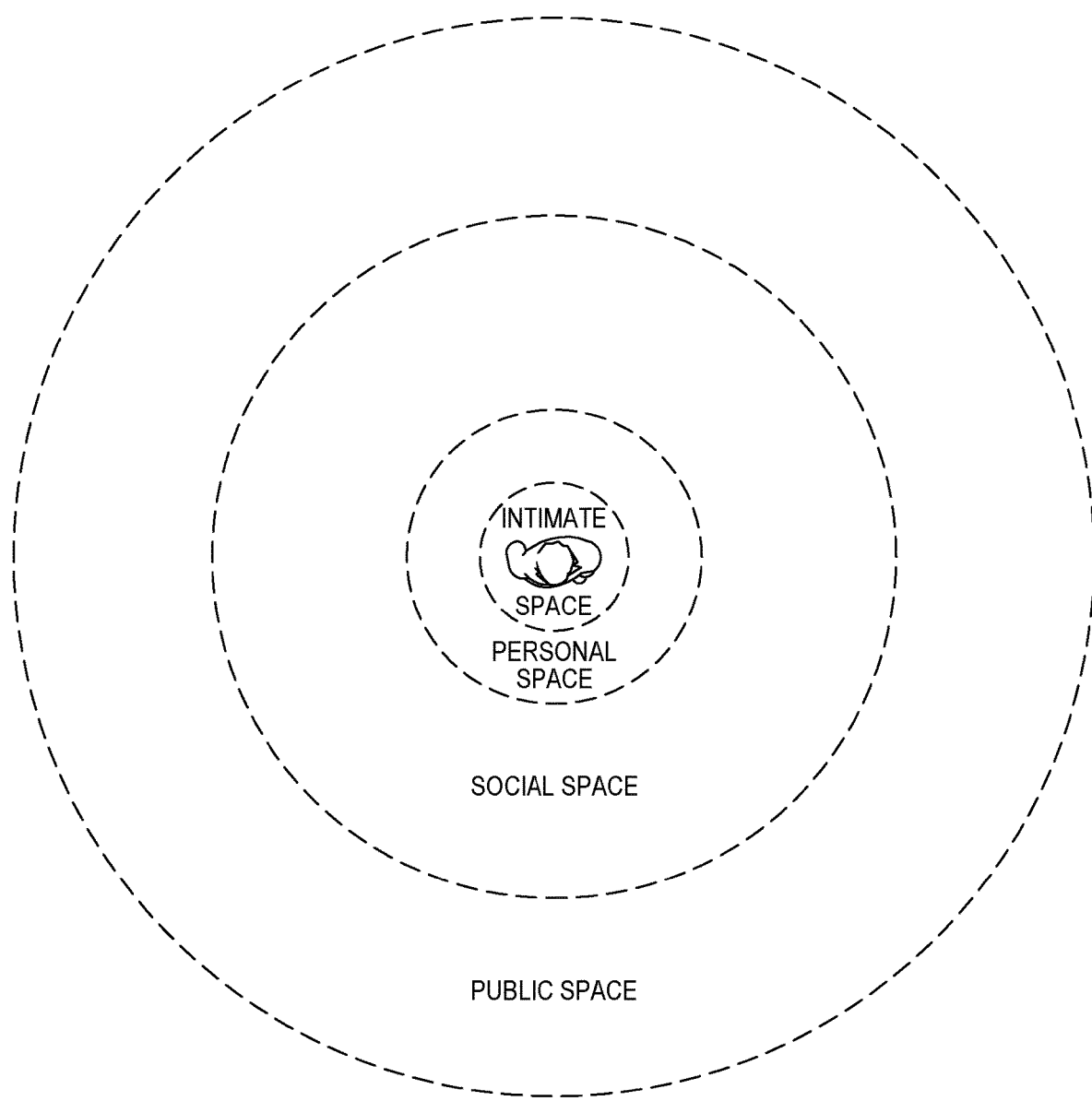
FIG. 1 depicts one embodiment of interpersonal distances, showing different ranges of acceptable interpersonal distances about an individual.

Aspects of the present invention and certain features, advantages and details thereof, are explained more fully below with reference to the non-limiting example(s) illustrated in the accompanying drawings. Descriptions of well-known materials, systems, devices, processing techniques, etc., are omitted so as to not unnecessarily obscure the invention in detail. It should be understood, however, that the detailed description and the specific example(s), while indicating aspects of the invention, are given by way of illustration only, and are not by way of limitation. Various substitutions, modifications, additions, and/or arrangements, within the spirit and/or scope of the underlying inventive concepts will be apparent to those skilled in the art from this disclosure. Note further that numerous inventive aspects and features are disclosed herein, and unless inconsistent, each disclosed aspect or feature is combinable with any other disclosed aspect or feature as desired for a particular application, for instance, for facilitating one or more communication aspects of an interaction between a first entity and a second entity.

Interaction between entities, such as between two or more individuals, may involve both verbal and non-verbal communication. Non-verbal communication between individuals is communication through sending and receiving wordless clues. Non-verbal communication includes visual cues such as body language (kinesics), distance (proxemics) and physical environment/appearance, of voice (paralanguage) and touch (haptics). It can also include chronemics (the use of time) and oculesics (eye contact and actions of looking while talking and listening). Verbal communication between individuals may also involve non-verbal elements known as paralanguage, including voice quality, rate, pitch, volume, and speaking style as well as prosodic features, such as rhythm, intonation, and stress.

As used herein, an interaction refers to an interaction with one or more communication aspects between two or more entities, such as between two or more individuals, or between an individual and a robotic device such as a mobile robotic device. Further, as described herein, one or more communication aspects may be facilitated in an interaction between first and second entities. The communication aspect(s) may be a non-verbal communication aspect or a verbal communication aspect, as explained herein.

Non-verbal communication may involve the conscious and unconscious processes of encoding and decoding. Encoding is the act of generating information such as facial expressions, gestures, postures, position, and decoding is the interpretation of information from received sensations and from previous experience. Disclosed herein, is the use of a recommendation engine, or cognitive recommendation engine, to facilitate providing one or more instruction recommendations to, for instance, a second entity in an interaction between a first entity and the second entity. The instruction recommendation(s) is indicative of one or more derived interaction preferences of the first entity, thereby facilitating the interaction from the viewpoint of the first entity. Various examples are discussed herein including, for instance, providing an instruction recommendation of a non-verbal communication aspect, such as an appropriate distance between the first and second entities during the interaction, which may be particularly helpful in the case of a mobile robotic entity interacting with an individual. Also note that, although discussed herein with reference to deriving one or more interaction preferences of the first entity, the concepts may equally apply to deriving interaction preferences of the second entity and providing one or more instruction recommendations to the first entity, for instance, in combination with providing instruction recommendations to the second entity to facilitate the interaction.

As noted, proxemics is a hidden, non-verbal component of interpersonal communication that may be uncovered or derived throughout observation and may be strongly influenced by culture or geographic region. By way of example, FIG. 1 depicts four generally understood interpersonal distances, which include, for instance, an intimate distance of a few inches, a personal distance for interaction among good friends or family, a social distance for interactions among acquaintances, as well as a public distance used, for instance, for addressing an audience. Depending on the interaction, it may be stressful for an individual to interact with another entity where the distance between the individual and entity is perceived to be inappropriate. Individuals have different senses of personal space. An individual's sense of personal space may not only differ at the culture and individual level, but may also be impacted by, for instance, the size and number of people or other objects or entities within a particular space. In order to facilitate interaction between entities, disclosed herein is a facility, including a computer-implemented method, system and computer program product, for assisting or facilitating an interaction between a first entity and a second entity. The interaction is facilitated using a recommendation engine, such as a cognitive recommendation engine, which provides one or more instruction recommendations to, for instance, the second entity for use by the second entity during the interaction with the first entity to facilitate the interaction from the first entity's viewpoint.

Figure 2A:
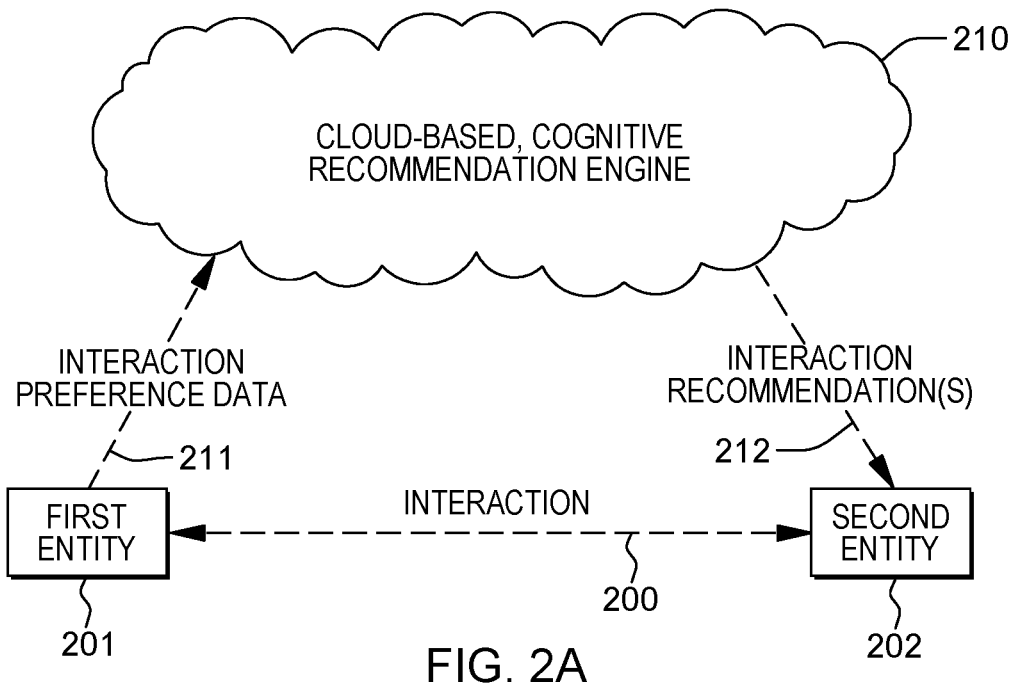
FIG. 2A depicts one embodiment of an interaction between a first entity and a second entity using, in part, a cloud-based cognitive recommendation engine which provides one or more instruction recommendations to facilitate the interaction of the first and second entities, in accordance with one or more aspects of the present invention.

FIG. 2A depicts one embodiment of an interaction 200 between a first entity 201 and a second entity 202, as well as a cloud-based cognitive recommendation engine 210 which obtains interaction preference data 211 by, for instance, monitoring first entity 201, and provides one or more instruction recommendations 212 to second entity 202 for use, for instance, during interaction 200.

By way of example, in one or more embodiments, cognitive recommendation engine 210 may be, or may utilize, for instance, a cloud-based system. One cognitive system is the Watson™ system available from International Business Machines Corporation of Armonk, N.Y., USA. The Watson™ system is an application of advanced natural language processing, information retrieval, knowledge representation and reasoning, and machine-learning technologies in the field of domain question answering. The Watson™ system is built on International Business Machines Corporation's DeepQA™ technology used for hypothesis generation, massive evidence gathering, analysis, and scoring.

In one or more implementations, first entity 201 may be an individual, and second entity 202 may be a robotic device, such as a mobile robotic device, or alternatively, another individual. In one or more embodiments, first entity 201 may have an electronic device, such as a smartphone, smartwatch, laptop computer, Internet of Things device, etc. associated therewith which communicates with cognitive recommendation engine 210 to provide cognitive recommendation engine 210 with interaction preference data 211 for interaction 200 from the viewpoint of first entity 201. In one or more further embodiments, interaction preference data 211 may alternatively, or also, be generated by second entity 202, such as, for instance, through a video camera associated with second entity 202, or by one or more monitors or sensors associated with an area, room, space, etc., where the first and second entities are currently located.

In one or more embodiments, the interaction preference data may be used to determine one or more instruction recommendations 212 to be provided to second entity 202 for use by second entity 202 during interaction 200 to, for instance, facilitate the interaction from the view of first entity 201. For instance, the instruction recommendation(s) may include a recommended spacing that second entity 202 may be instructed to implement from first entity 201 during interaction 200. Where second entity 202 is another individual, the instruction recommendation(s) 212 could be provided to, for instance, a mobile device associated with second entity 202, such as a smartphone, smartwatch, personal digital assistant, etc. In the case where second entity 202 is a robotic device, such as mobile robotic device, the instruction recommendation(s) 212 could be communicated directly to second entity 202 via any conventional communications interface between cognitive recommendation engine 210 and second entity 202. In the non-verbal communication aspect example of spacing between the first and second entities during the interaction, the cognitive recommendation engine 210 may provide an instruction recommendation 212 to second entity 202 to instruct the second entity 202 in an appropriate spacing to be achieved or maintained from first entity 201 during interaction 200.

Figure 2B:
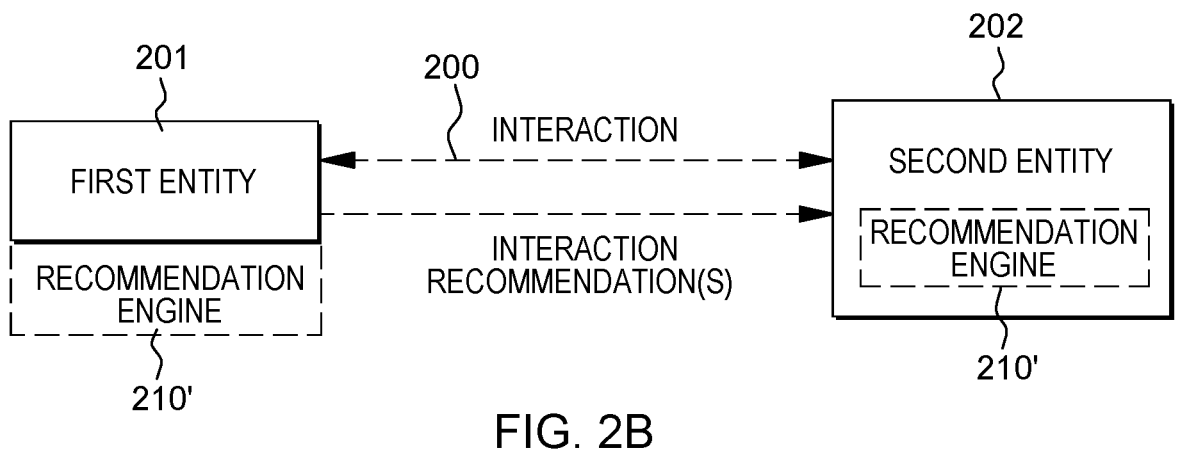
FIG. 2B depicts an alternative location for the cognitive recommendation engine of FIG. 2A, wherein the recommendation engine is associated with the first entity, such as with an electronic device of the first entity, or the second entity, in accordance with one or more aspects of the present invention.

FIG. 2B depicts an alternate implementation of interaction 200 between first entity 201 and second entity 202 wherein either or both of first entity 201, and second entity 202, have cognitive recommendation engine 210' associated therewith, such as in the case of an individual (e.g., entity 201) with an associated mobile device, or in the case of a robotic device (e.g., entity 202), incorporated as part of the computing capacity of the robotic device.

In one or more implementations, the processing described herein may be used to establish an appropriate spacing for a mobile robotic device (e.g., second entity 202) to be from an individual (e.g., first entity 201) so that the individual does not feel that their personal space is violated. In one or more embodiments, a recommendation engine, such as a cognitive recommendation engine, allows information about the person to be collected and analyzed (that is, for interaction preference data to be obtained and evaluated). In one or more embodiments, the mobile robotic device may initially be instructed with geographic norms to move within a certain distance of the person. The cognitive recommendation engine may monitor feedback of the person (i.e., the first entity's reactions) to the spacing of the mobile robotic device (i.e., second entity) relative to the first entity during the interaction. Signs of the person wanting the mobile robotic device to be further away might include the individual backing away, the individual folding their arms, or providing other inputs to the system that the mobile robotic device is too close. Feedback that the mobile robotic device is too far away may include the individual stepping in, leaning in, or providing other input that the mobile robotic device is too far away. Various monitoring approaches could be employed, including video or audio monitoring of the interaction, or more particularly, the first entity or individual during the interaction, as well as other feedback data, such as monitoring stress of the individual (for instance, with a high stress level being indicative that the mobile robotic device is too close). Monitoring may be performed in a variety of ways, including, by using video cameras, Internet of Things devices, smartphones, smartwatches or other monitoring or sensing technology, including using one or more monitoring devices on the mobile robotic device in monitoring the individual (i.e., first entity) during the interaction, or within an area, room, space, etc. of the interaction. For instance, a video data stream of the first individual may be captured by the second entity (e.g., mobile robotic device) during the interaction, which may then be used by the cognitive recommendation engine in determining an instruction recommendation that will facilitate from the first entity's view the interaction between the first and second entities. As noted, in one or more embodiments, monitoring may also, or alternatively, be performed using devices, sensors, cameras, etc. associated with an area, room, space, etc. where the first and second entities are currently located.

The interaction preference data may further include the size and volume of the mobile robotic entity, as well as the number of people or other objects, such as other robotic devices within the area of the interaction, which could impact the personal preference of the individual, as well as the frequency that the individual has interfaced with a specific mobile robotic device, or other mobile robotic devices of similar make or model. The cognitive recommendation engine may go through a learning loop which over time may be tuned to find the actual preferred distance from the individual's viewpoint for the interaction. When available, additional data such as data from a formal personality test (for instance, a Meyers-Brigg test) could provide insight into the individual's personality which may be included as part of the interaction preference data for pattern matching by the recommendation engine in determining one or more instruction recommendations for directing an appropriate spacing between the mobile robotic device and the individual. As noted, in one or more implementations, any appropriate electronic device or system, such as a personal communication device, may be used to broadcast on an open communication channel, the individual's interaction preference data, as well as to be broadcast the instruction recommendation(s) to the mobile robotic device. In one or more implementations, such as depicted in FIG. 2B, this broadcast may be directly between the personal communication device of the individual (e.g., first entity) and the mobile robotic device (e.g., second entity).

The above-noted example may be generalized in a number of aspects. For instance, the second entity, rather than being a mobile robotic device, could be a second person, and the instruction recommendation(s) may be shared with the second person via a personal communication device associated with the second person, with the information being used by the second person to facilitate the interaction by placing the first person (e.g., first entity) at ease during the interaction by, for instance, standing or remaining at an appropriate distance from the first person during the interaction. Further, in one or more other aspects, the communication aspect of the interaction being directed by the cognitive recommendation engine may be a different non-verbal communication aspect, or even a verbal communication aspect such as tone, volume, pace, etc., of a verbal communication being provided by the second entity (e.g., the mobile robotic device).

Advantageously, disclosed herein is a facility which allows for an individual's personal preference on one or more communication aspects of an interaction to be determined (such as to be learned or derived), and shared via one or more instruction recommendations, to automatically facilitate a second entity's interaction with the individual, that is, from the viewpoint of the individual. In one or more embodiments, the communication aspect may relate to a preferred personal space, and one or more Internet of Things sensors or other monitoring devices may be employed to provide interaction preference data as feedback to a recommendation engine that generates the instruction recommendation. Using this facility, placement of a mobile robotic device may be automatically adjusted in regards to the individual the device is interacting with, with a wide variety of factors being considered in determining the appropriate instruction recommendation for the spacing. Advantageously, in one or more implementations, the cognitive recommendation engine disclosed herein, could be a cloud-based computing system or a cloud-based service that processes interaction preference data of one or more individuals and provides interaction recommendations to one or more other entities for interacting with the one or more individuals.

Figure 3:
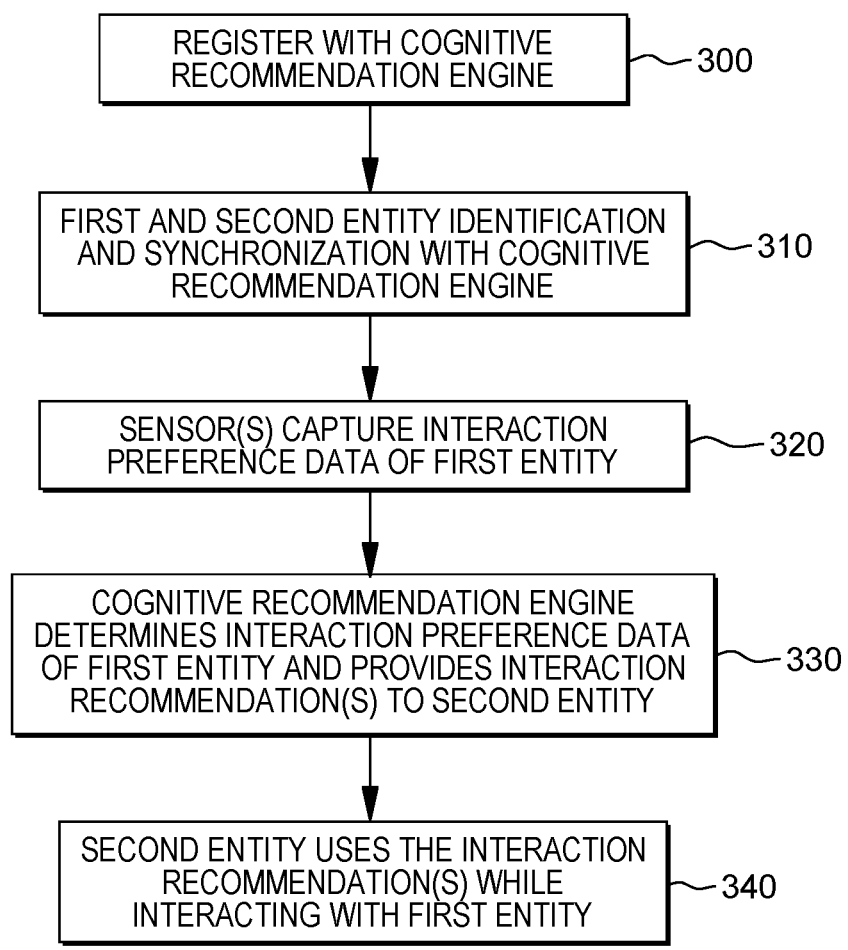
FIG. 3 depicts one embodiment of processing, in accordance with one or more aspects of the present invention.

FIG. 3 depicts one embodiment of a process, in accordance with one or more aspects of the present invention. As illustrated, in one or more implementations, a first entity, such an individual, may register with the cognitive recommendation engine 300. For instance, a person may register their Internet of Things devices, smartphones, smartwatches, etc., with the recommendation engine. Further, the individual may optionally enter personal information, such as, for instance, cultural background, height, a Meyers-Brigg score, etc., to assist the recommendation engine in understanding the individual's personal preferences for one or more communication aspects of an interaction.

First and second entities of an interaction are identified, and monitors and/or communication devices are synchronized with the cognitive recommendation engine 310. By way of example, an individual's Internet of Things devices may broadcast an identification to the robotic device that includes an interface to the recommendation engine. The robotic device may receive the broadcast and synchronize with the recommendation engine. The robotic device may also share identifying information and specifications, such as a personal identification code, make/model information, height, etc., with the recommendation engine. With this information, the robotic device may be able to read any previous encounters with the individual, and use those encounters as a starting point for setting the communication aspect, such as the personal space preference of the individual. Internet of Things devices may read the location of the robotic device and track it if a person is moving closer to or away from the robot.

One or more monitors or sensors capture interaction preference data of the first entity 320. This interaction preference data may be obtained during one or more interactions with one or more entities, including the current interaction with the second entity. By way of example, sensors on the individual may capture movement towards or away from the robotic device. A video camera on the robotic device and/or within an area, room, space, etc., where the entities are located, may capture movement of the individual (e.g., first entity). A sensor on the person may capture change of stress level (e.g., the robotic device is too close, resulting in an increase in heart rate). The camera(s) may capture body posture, facial images, etc., that identify the individual's stress. Further, the camera(s) may capture a total number of people and other objects or robots within the area, as well as the size of the area, with personal space preferences differing between individuals based on a size of a space, as well as the extent of the crowd within the space. Further, the individual may enter positive or negative comments or reviews into an electronic device, such as a smartwatch or smartphone associated with the individual, in order to input that information to the cognitive recommendation engine directly. Any appropriate communication protocol and communication channels, such as wireless communication, as well as communication across the Internet, may be employed in communicating between one or more electronic devices associated with the individual and the cognitive recommendation engine, as well as between the cognitive recommendation engine and the robotic device.

The cognitive recommendation engine determines interaction preference data of the first entity, and provides one or more interaction recommendations to the second entity 330. As noted herein, the recommendation engine could be implemented as a central service, such as a cloud-based service, or could be implemented on an electronic device, such as a computing device, associated with or possessed by the first entity, or by the second entity. Where the second entity is a robotic device, the cognitive recommendation engine could be integrated as part of the robotic device. In one or more implementations, the recommendation engine may be primed with information about human-to-human contact for an individual, until sufficient data is available for an interaction with a robotic device. The recommendation engine may differentiate preferences during a learning phase based on personality type. Further, the recommendation engine may learn or derive during a learning a loop, or by trial and error, when the robotic device should move closer or further away from the individual, based on monitor or sensor inputs. Previous interactions with the robotic device may be considered, with the recommendation engine tracking familiarity with a specific robot or a specific make/model of robot, and dynamically adjusting the instruction recommendation over time, as the individual becomes more familiar with the robot and comfortable in interacting with the robot. Note that, in one or more other implementations, this capability may also be employed where the second entity is an individual, and feedback is being dynamically adjusted to the second individual based, for instance, with tracked familiarity with the first individual. For instance, the instruction recommendation regarding spacing provided to the second individual may be adjusted over time based on history of the second individual with the first individual. Sensor readings may be used to identify when the individual is becoming more comfortable with the robotic device (or other individual). The recommendation engine may broadcast, for instance, via near-field communication (NFC) to the robotic device (or electronic device of the second individual) to adjust the location of the second entity, or adjust another communication aspect of the second entity. Note in this regard that device-to-device or computer-to-computer communications are well-known in the art.

The second entity may then use the interaction recommendation(s) while interacting with the first entity 340. For instance, the robotic device may adjust the spacing based on the recommendation(s) of the recommendation engine. Note that the spacing may refer to spacing while the first and second entities are standing still, or while the entities are in motion.

As noted herein, the communication aspect being evaluated and instructed may be any of a variety of communication aspects relating to an interaction between entities. For human-to-human adjustments, the communication aspect may be based on communications with a mobile device, such as a smartwatch. For instance, the recommendation engine could provide the second individual with an instruction to move closer or further from the first individual by communicating with the individual's smartwatch, smartphone, or other electronic device. Verbal communication aspects may also be instructed using a facility such as disclosed herein. For instance, vocal tone or pace feedback could be based one or more Internet of Things sensor inputs, as well as the frequency an individual may ask a robotic device to repeat what was said.

By way of still further example, FIGS. 4A & 4B depict a method for facilitating an interaction of a first entity and a second entity, in accordance with one or more aspects of the present invention. As illustrated, the facilitating may include instructing, by a cognitive recommendation engine, a communication aspect of the interaction of the first entity and the second entity 400. The instructing may include obtaining, by the cognitive recommendation engine, the interaction preference data of the first entity related to the communication aspect of the interaction, and based on the interaction preference data, determining by the cognitive recommendation engine an instruction recommendation(s). The instruction recommendation(s) facilitates, from the first entity's view, the interaction between the first and second entities. Further, the instructing includes providing by the cognitive recommendation engine the instruction recommendation(s) to the second entity for use by the second entity during the interaction with the first entity.

In one or more embodiments, the communication aspect includes a non-verbal communication aspect of the interaction between the first and second entities 405. For instance, the non-verbal communication aspect may include a distance between the first and second entities during the interaction 410.

In one or more embodiments, the first entity may be an individual, and the second entity a mobile robotic device, and the method may further include adjusting by the mobile robotic device the distance between the first and second entities during the interaction, based on the instruction recommendation(s) 415.

In one or more implementations, the cognitive recommendation engine may dynamically determine the instruction recommendation(s) by, at least in part, monitoring the first entity during the interaction 420. More generally, obtaining the interaction preference data of the first entity may include monitoring the first entity during one or more interactions with one or more other entities 425. In such a case, the one or more interactions may include the interaction between the first and second entities, and the one or more other entities may include the second entity 430.

In one or more embodiments, obtaining the interaction preference data may include monitoring the first entity via one or more monitors to capture feedback data on the first entity during the one or more interactions, the feedback data being indicative of an interaction preference of the first entity during the one or more interactions. The interaction preference data may include the feedback data 435. In implementation, the cognitive recommendation engine may derive the interaction preference of the first entity from the interaction preference data, and determine the instruction recommendation(s) based on the derived interaction preference of the first entity 440.

In one or more embodiments, the first entity may be a first individual, the second entity a second individual, and providing by the cognitive recommendation engine the instruction recommendation(s) may include providing the instruction recommendation(s) to an electronic device associated with the second entity for use by the second entity during the interaction with the first entity 445.

In one or more embodiments, the communication aspect may include a verbal communication aspect used by the second entity during the interaction with the first entity, and the first entity may be a first individual, and the second entity a second individual or a robotic device 450.

Further exemplary embodiments of a computing environment to implement one or more aspects of the present invention are described below with reference to FIGS. 5-7.

Figure 5:
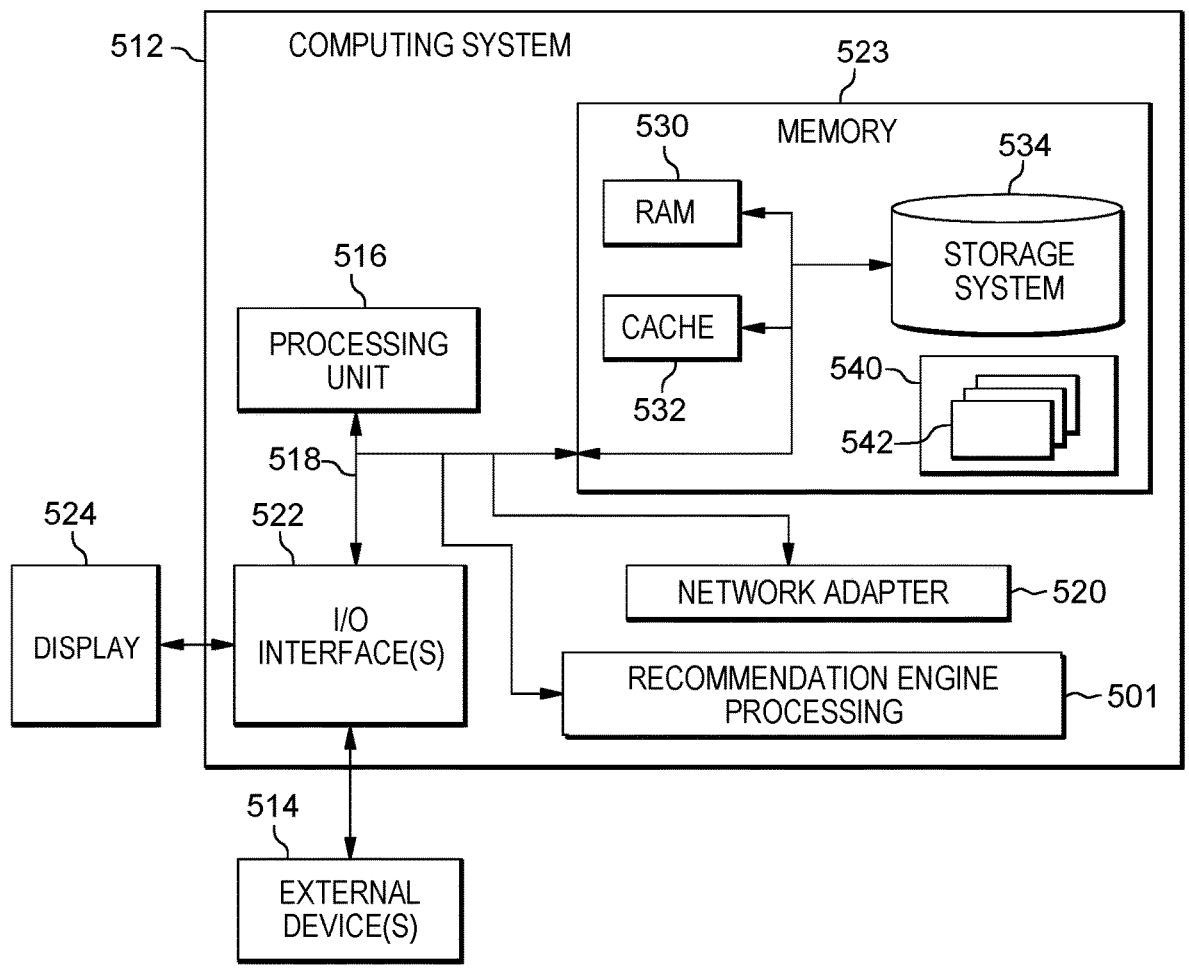
FIG. 5 depicts one embodiment of a computing system which may implement or facilitate implementing recommendation engine processing, in accordance with one or more aspects of the present invention.

By way of further example, FIG. 5 depicts one embodiment of a computing environment 500, which includes a computing system 512. Examples of well-known computing systems, environments, and/or configurations that may be suitable for use with computer system 512 include, but are not limited to, a server, a desktop computer, a work station, a wireless computer, a handheld or laptop computer or device, a mobile phone, a programmable consumer electronic device, a tablet, a personal digital assistant (PDA), and the like.

Computing system 512 may be described in the general context of computer system-executable instructions, such as program modules, being executed by a computer system. Generally, program modules may include routines, programs, objects, components, logic, data structures, and so on that perform particular tasks or implement particular abstract data types.

As depicted in FIG. 5, computing system 512, is shown in the form of a general-purpose computing device. The components of computing system 512 may include, but are not limited to, one or more processors or processing units 516, a system memory 523, and a bus 518 that couples various system components including system memory 523 to processor 516.

In one embodiment, processor 516 may be based on the z/Architecture® offered by International Business Machines Corporation, or other architectures offered by International Business Machines Corporation or other companies. z/Architecture® is a registered trademark of International Business Machines Corporation, Armonk, N.Y., USA. One embodiment of the z/Architecture® is described in "z/Architecture® Principles of Operation," IBM Publication No. SA22-7832-10, March 2015, which is hereby incorporated herein by reference in its entirety.

In other examples, it may be based on other architectures, such as the Power Architecture offered by International Business Machines Corporation. One embodiment of the Power Architecture is described in "Power ISA™ Version 2.07B," International Business Machines Corporation, Apr. 9, 2015, which is hereby incorporated herein by reference in its entirety. POWER ARCHITECTURE is a registered trademark of International Business Machines Corporation, Armonk, N.Y., USA. Other names used herein may be registered trademarks, trademarks, or product names of International Business Machines Corporation or other companies.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing system 512 may include a variety of computer system readable media. Such media may be any available media that is accessible by computing system 412, and it includes both volatile and non-volatile media, removable and non-removable media.

System memory 523 can include computer system readable media in the form of volatile memory, such as random access memory (RAM) 530 and/or cache memory 532. Computing system 512 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media could be provided. In such instances, each can be connected to bus 518 by one or more data media interfaces. As described below, memory 523 may include at least one program product having a set (e.g., at least one) of program modules that are configured to carry out the functions of embodiments of the invention.

Program/utility 540, having a set (at least one) of program modules 542, may be stored in memory 532 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein. Alternatively, a recommendation engine processing module, logic, etc., 501 may be provided within computing environment 512.

Computing system 512 may also communicate with one or more external devices 514 such as a keyboard, a pointing device, a display 524, etc.; one or more devices that enable a user to interact with computing system 512; and/or any devices (e.g., network card, modem, etc.) that enable computing system 512 to communicate with one or more other computing devices. Such communication can occur via Input/Output (I/O) interfaces 522. Still yet, computing system 512 can communicate with one or more networks such as a local area network (LAN), a general wide area network (WAN), and/or a public network (e.g., the Internet) via network adapter 520. As depicted, network adapter 520 communicates with the other components of computing system, 512, via bus 518. It should be understood that although not shown, other hardware and/or software components could be used in conjunction with computing system 512. Examples, include, but are not limited to: microcode, device drivers, redundant processing units, external disk drive arrays, RAID systems, tape drives, and data archival storage systems, etc.

One or more aspects may relate to or use cloud computing.

It is understood in advance that although this disclosure includes a detailed description on cloud computing, implementation of certain teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

A cloud computing node may include a computer system/server, such as the one depicted in FIG. 5. Computer system/server 512 of FIG. 5 may be practiced in distributed cloud computing environments where tasks are performed by remote processing devices that are linked through a communications network. In a distributed cloud computing environment, program modules may be located in both local and remote computer system storage media including memory storage devices. Computer system/server 512 is capable of being implemented and/or performing any of the functionality set forth hereinabove.

Figure 6:
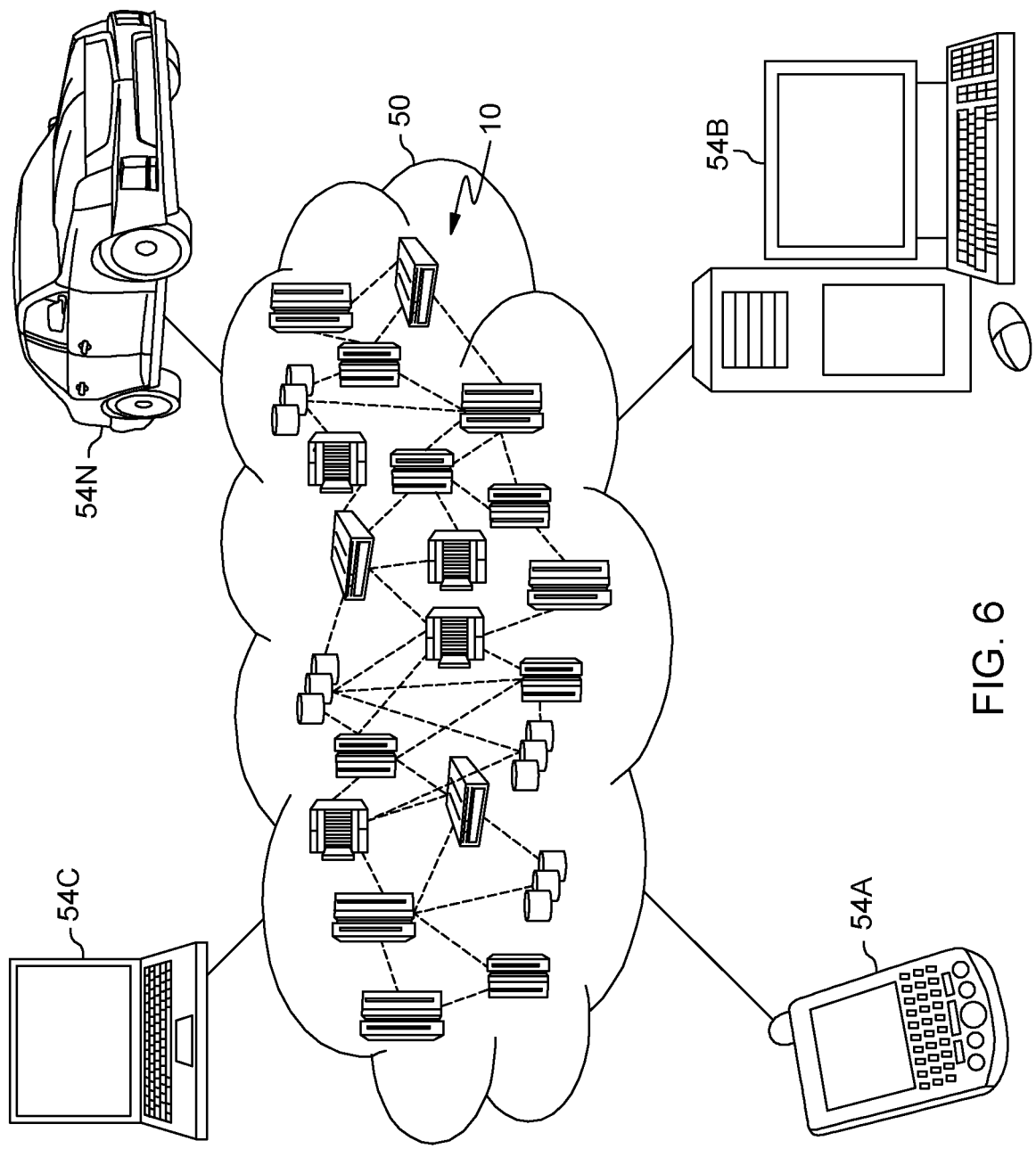
FIG. 6 depicts one embodiment of a cloud computing environment which may facilitate implementing, or be used in association with, one or more aspects of the present invention.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
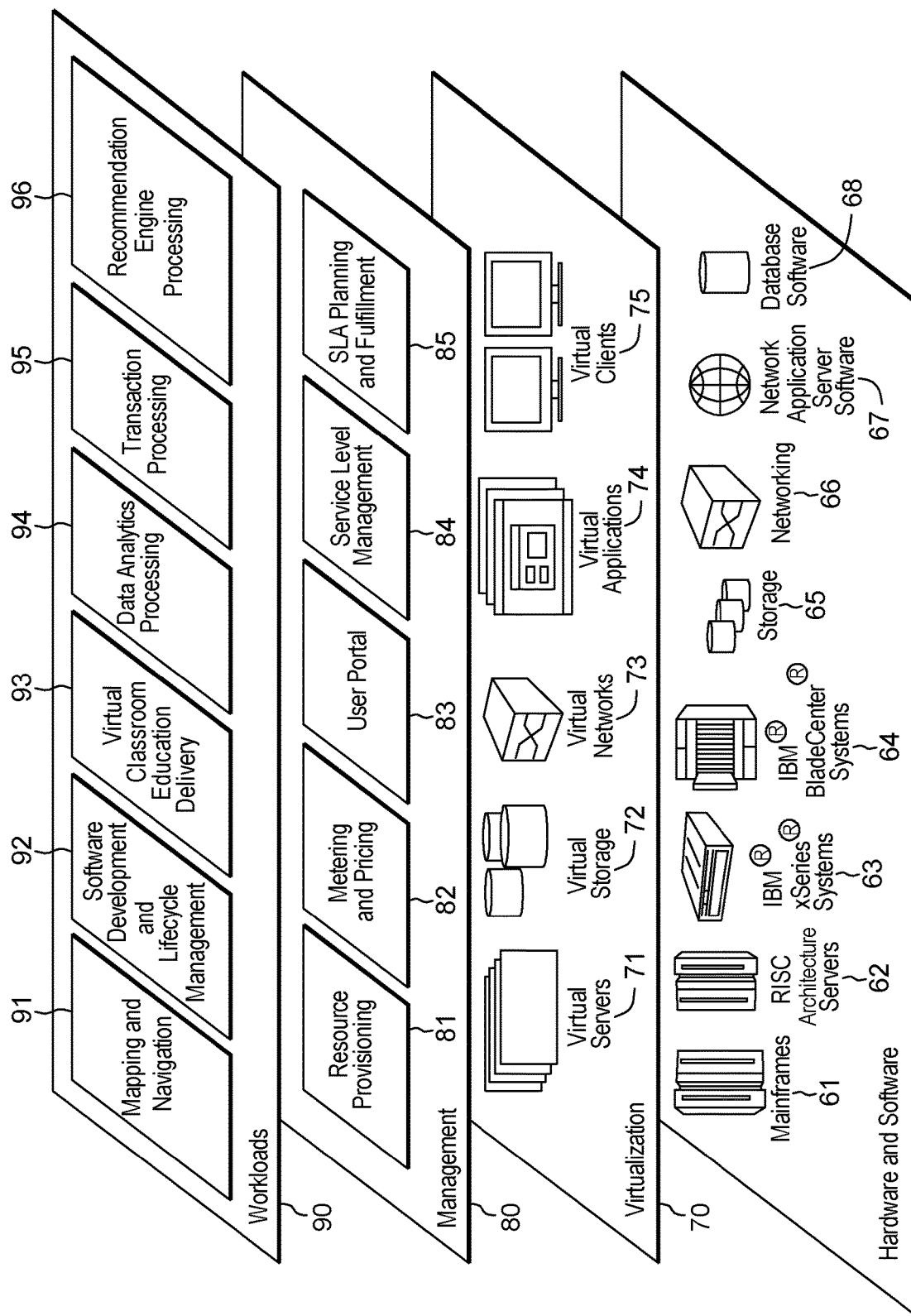
FIG. 7 depicts an example of extraction model layers, which may facilitate implementing recommendation engine processing, in accordance with one or more aspects of the present invention.

Referring to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and recommendation engine processing 96.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A computer-implemented method of facilitating an interaction of a first entity and a second entity, the method comprising:

receiving a registration of the first entity, via a device of the first entity, at a cognitive recommendation engine, the cognitive recommendation engine facilitating a communication aspect of the interaction of the first entity and the second entity;

synchronizing one or more electronic devices of at least one of the first entity or the second entity with the cognitive recommendation engine, the one or more electronic devices to facilitate monitoring, at least in part, the first entity during the interaction of the first entity and the second entity;

obtaining, by the cognitive recommendation engine, interaction preference data of the first entity related to the communication aspect of the interaction from the one or more electronic devices synchronized with the cognitive recommendation engine, the interaction preference data being dynamically obtained during the interaction of the first entity and the second entity;

based on the dynamically obtained interaction preference data, determining by the cognitive recommendation engine an instruction recommendation, the instruction recommendation facilitating from the first entity's view the interaction between the first and second entities; and providing by the cognitive recommendation engine the instruction recommendation to the second entity for use by the second entity during the interaction with the first entity.

2. The computer-implemented method of claim 1, wherein the communication aspect comprises a non-verbal communication aspect of the interaction between the first and second entities.

3. The computer-implemented method of claim 2, wherein the non-verbal communication aspect comprises a distance between the first and second entities during the interaction.

4. The computer-implemented method of claim 3, wherein the first entity is an individual, and the second entity is a mobile robotic device, and the method further comprises adjusting by the mobile robotic device the distance between the first and second entities during the interaction based on the instruction recommendation.

5. The computer-implemented method of claim 2, wherein obtaining the interaction preference data of the first entity comprises monitoring the first entity during one or more interactions with one or more other entities.

6. The computer-implemented method of claim 5, wherein the one or more interactions comprise the interaction between the first and second entities, and the one or more other entities comprise the second entity.

7. The computer-implemented method of claim 5, wherein the obtaining the interaction preference data comprises monitoring the first entity via the one or more electronic devices to capture feedback data on the first entity during the one or more interactions indicative of an interaction preference of the first entity during the one or more interactions, the interaction preference data comprising the feedback data.

8. The computer-implemented method of claim 7, wherein the cognitive recommendation engine derives the interaction preference of the first entity from the interaction preference data and determines the instruction recommendation based on the derived interaction preference of the first entity.

9. The computer-implemented method of claim 1, wherein the first entity is a first human and the second entity is a second human, and providing by the cognitive recommendation engine the instruction recommendation includes providing the instruction recommendation to an electronic device associated with the second human for use by the second human during the interaction with the first human.

10. The computer-implemented method of claim 1, wherein the communication aspect comprises a verbal communication aspect used by the second entity during the interaction with the first entity, the first entity being a first individual and the second entity being a second individual or a robotic device.

11. A system for facilitating an interaction of a first entity and a second entity, the system comprising:

a memory; and a processor communicatively coupled to the memory, wherein the system performs a method comprising:

receiving a registration of the first entity, via a device of the first entity, at a cognitive recommendation engine, the cognitive recommendation engine facilitating a communication aspect of the interaction of the first entity and the second entity;

synchronizing one or more electronic devices of at least one of the first entity or the second entity with the cognitive recommendation engine, the one or more electronic devices to facilitate monitoring, at least in part, the first entity during the interaction of the first entity and the second entity;

obtaining, by the cognitive recommendation engine, interaction preference data of the first entity related to the communication aspect of the interaction from the one or more electronic devices synchronized with the cognitive recommendation engine, the interaction preference data being dynamically obtained during the interaction of the first entity and the second entity;

based on the dynamically obtained interaction preference data, determining by the cognitive recommendation engine an instruction recommendation, the instruction recommendation facilitating from the first entity's view the interaction between the first and second entities; and providing by the cognitive recommendation engine the instruction recommendation to the second entity for use by the second entity during the interaction with the first entity.

12. The system of claim 11, wherein the communication aspect comprises a non-verbal communication aspect of the interaction between the first and second entities, and wherein the non-verbal communication aspect comprises a distance between the first and second entities during the interaction.

13. The system of claim 12, wherein the first entity is an individual, and the second entity is a mobile robotic device, and the method further comprises adjusting by the mobile robotic device the distance between the first and second entities during the interaction based on the instruction recommendation.

14. The system of claim 11, wherein obtaining the interaction preference data of the first entity comprises monitoring the first entity during one or more interactions with one or more other entities.

15. The system of claim 14, wherein the obtaining the interaction preference data comprises monitoring the first entity via the one or more electronic devices to capture feedback data on the first entity during the one or more interactions indicative of an interaction preference of the first entity during the one or more interactions, the interaction preference data comprising the feedback data.

16. The system of claim 11, wherein the first entity is a first human and the second entity is a second human, and providing by the cognitive recommendation engine the instruction recommendation includes providing the instruction recommendation to an electronic device associated with the second human for use by the second human during the interaction with the first human.

17. The system of claim 11, wherein the communication aspect comprises a verbal communication aspect used by the second entity during the interaction with the first entity, the first entity being a first individual and the second entity being a second individual or a robotic device.

18. A computer program product for facilitating an interaction of a first entity and a second entity, the computer program product comprising:
   a computer readable storage medium having computer readable program code embodied therewith, the computer readable program code being executable by a processor to perform a method comprising:
      receiving a registration of the first entity, via a device of the first entity, at a cognitive recommendation engine, the cognitive recommendation engine facilitating a communication aspect of the interaction of the first entity and the second entity;
      synchronizing one or more electronic devices of at least one of the first entity or the second entity with the cognitive recommendation engine, the one or more electronic devices to facilitate monitoring, at least in part, the first entity during the interaction of the first entity and the second entity;
      obtaining, by the cognitive recommendation engine, interaction preference data of the first entity related to the communication aspect of the interaction from the one or more electronic devices synchronized with the cognitive recommendation engine, the interaction preference data being dynamically obtained during the interaction of the first entity and the second entity;
      based on the dynamically obtained interaction preference data, determining by the cognitive recommendation engine an instruction recommendation, the instruction recommendation facilitating from the first entity's view the interaction between the first and second entities; and
      providing by the cognitive recommendation engine the instruction recommendation to the second entity for use by the second entity during the interaction with the first entity.

\* \* \* \* \*